Aug. 19, 1941. G. G. GILPIN Re. 21,879

REFRIGERATOR CAR

Original Filed Oct. 12. 1937 2 Sheets-Sheet 1

Inventor:
Garth G. Gilpin,
By Inton & Ellison Atty.

Aug. 19, 1941. G. G. GILPIN Re. 21,879

REFRIGERATOR CAR

Original Filed Oct. 12, 1937 2 Sheets-Sheet 2

Inventor:
Garth G. Gilpin,
By Anton E. Lisson
Atty.

Reissued Aug. 19, 1941 Re. 21,879

UNITED STATES PATENT OFFICE 21,879

REFRIGERATOR CAR

Garth G. Gilpin, Riverside, Ill., assignor, by mesne assignments, to Standard Railway Equipment Manufacturing Company, a corporation of Delaware Original No. 2,207,678, dated July 9, 1940, Serial No. 168,611, October 12, 1937. Application for reissue January 22, 1941, Serial No. 375,481

16 Claims. (Cl. 62—17)

The invention relates to insulated railway refrigerator cars used to transport perishable commodities, such as vegetables, fruits, berries, meats, eggs, frozen fish, etc., and to maintain such commodities while in transit within a predetermined range of temperature, thus necessitating the provision of a refrigerant in the summer, a heating means in the winter and ventilating means for use with certain commodities during some seasons of the year. It has been found that perishable commodities which have not been allowed to get too cold (freeze) or too hot (bake) have a high market value because they have a longer storage life.

The invention relates specifically to refrigerator cars having hatchways in the roof thereof for putting ice or other refrigerant into refrigerant containers or chambers located adjacent the roof, which hatchways are preferably provided with frames, lids and plugs of the usual construction.

The object of the invention is to support a refrigerant container for such refrigerants as wet ice, dry ice or brine in spaced relation to the roof or ceiling of a refrigerator car to provide for air circulation therebetween and to associate portions of the container and the hatch frame so as to close part of the space between the container and the hatch frame.

Another object is to provide means which will not interfere with the ready removal or replacement of the refrigerant container. Such arrangement increases the ice capacity of the car because the ice may be placed in the hatch frame up to the plug.

When a refrigerator car is used to transport certain commodities, such as potatoes, which generate heat, it is desirable to ventilate the car which is done by opening the hatchways. Another object of the invention is to provide a path for flow of ventilating air into the interior of the car, and a further object is to provide means to open part of the space between the container and the hatch frame (or car ceiling) when the hatch lid is in open position for car ventilation which means automatically closes such part when the latch lid is lowered to closed position.

Another object of the invention is to provide means to attach the container to the vertical walls of the car so the container may be detached from said vertical walls and lowered without disturbing the roof of the car. It is difficult to disturb the roof of the car without disturbing the insulation thereof and thereby affecting the insulating value of the roof.

Figure 1:
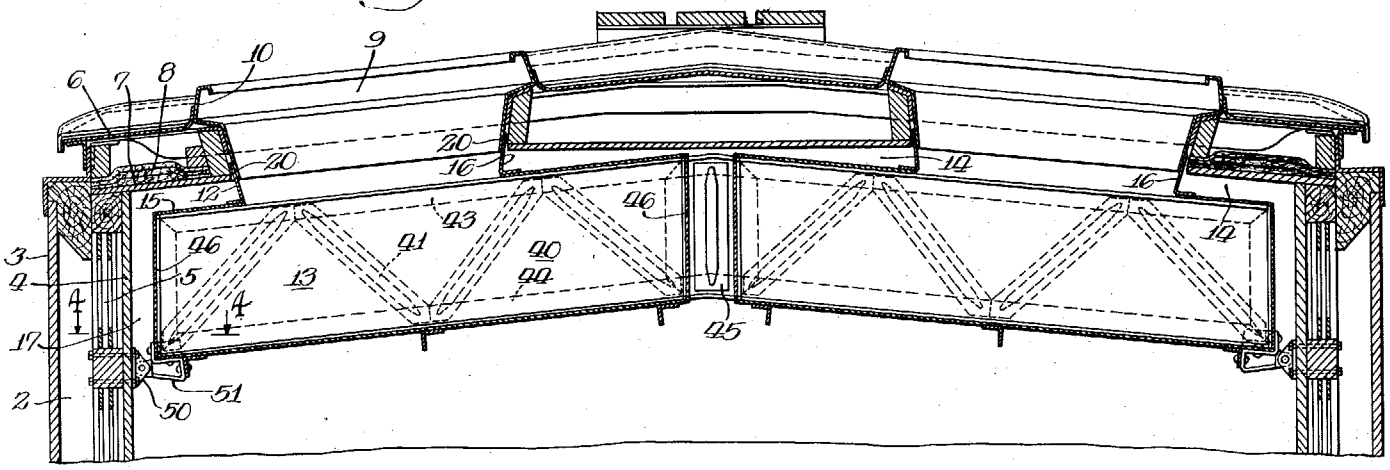
Fig. 1 shows a cross section on the top of a refrigerator car provided with my improved structure.
Figure 4:
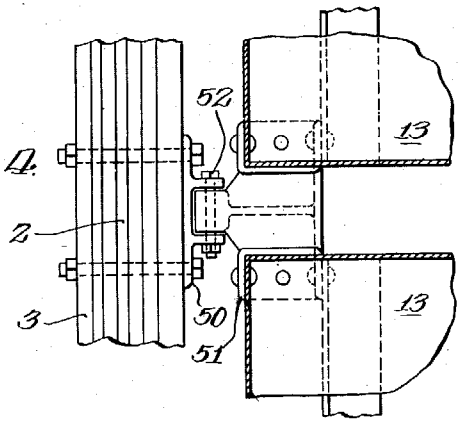
Fig. 4 shows the refrigerant chamber support.

The drawings illustrate the usual parts of the car, such as side wall 2, side wall sheathing 3, side wall lining 4, side wall insulating 5, roof 6, roof ceiling 7, roof insulation 8, hatch opening 9 and hatch frame 10.

The hatch frame 10 surrounds the hatch opening 9 with a space 12 around the lower part of the frame and the refrigerant container 13 is spaced below the ceiling 7 of the car to provide a space 14 for air circulation therebetween. This refrigerant container 13 has an opening in the upper wall 15 thereof for loading the container, which opening is surrounded by an upwardly projecting flange 16 which fits into the space 12 around the hatch frame and is in overlapping relation therewith to provide a seal between the refrigerant container 13 and the hatch frame 10 so that liquid brine can not splash from the container into the car and also so that ice being put into the container from the outside of the car will not enter the space 14 between the container and the roof or the space 17 between the container 13 and the side wall 2, and furthermore, so that the refrigerant container 13 may be lowered so as to be removed or replaced without disturbing the roof, roof insulation or ceiling of the car.

The hatch frame preferably comprises downwardly and inwardly inclined walls 20 and the upwardly projecting flange 16 of the refrigerant container 13 is outwardly flared so that as the refrigerant container is moved upwardly the walls 20 of the hatch frame 10 engages the flange 16 of the refrigerant container and guide it into proper position.

Figure 2:
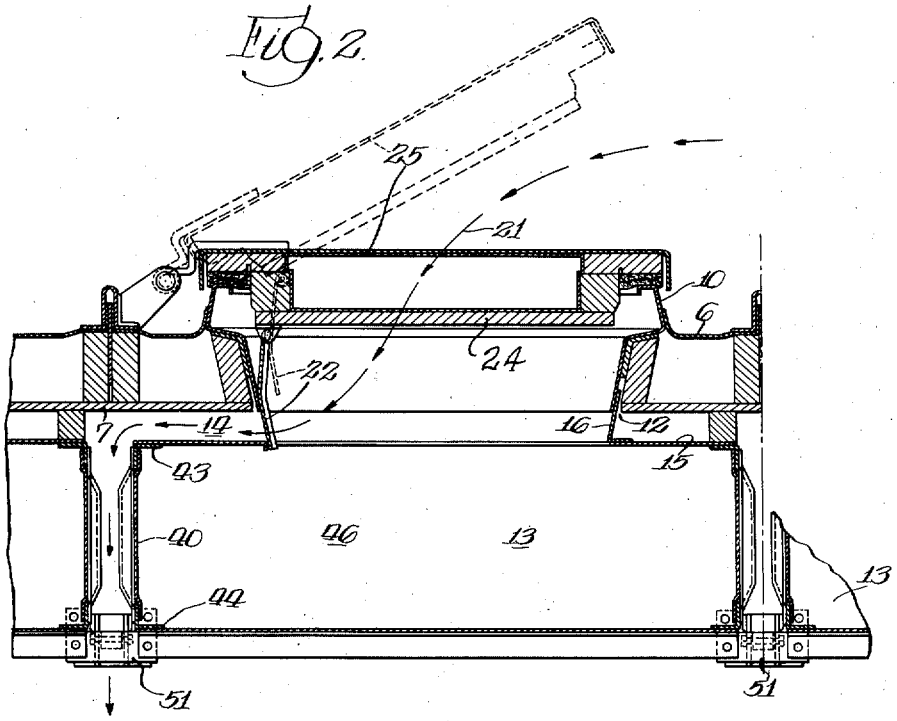
Fig. 2 shows a longiutdinal section of the car shown in Fig. 1 with the hatch lid and plug added.

Fig. 2 shows a modification wherein the upstanding flange 16 is omitted on one side of the opening in the refrigerant chamber 13 so that ventilating air, being prevented by the substantially imperforate chamber 13 from flowing downwardly directly into the lading compartment in substantial amounts, follows the path indicated by the arrows 21. The apron 22 is swingably hinged to the lid 24 so that when the lid is in inclined or open position (as shown in dotted lines 25) the space between the ceiling 7 and refrigerant chamber 13 is open for air circulation and ventilating air flows through the hatch opening 9, space 14, downwardly through the duct between container 13 and the adjacent container and thence into the lading compartment of the car. When the lid is lowered to horizontal, or closed position, the apron 22 automatically moves to the position shown in full lines and closes that portion of the space 14 between the ceiling and roof when the upstanding flange is omitted.

Figure 3:
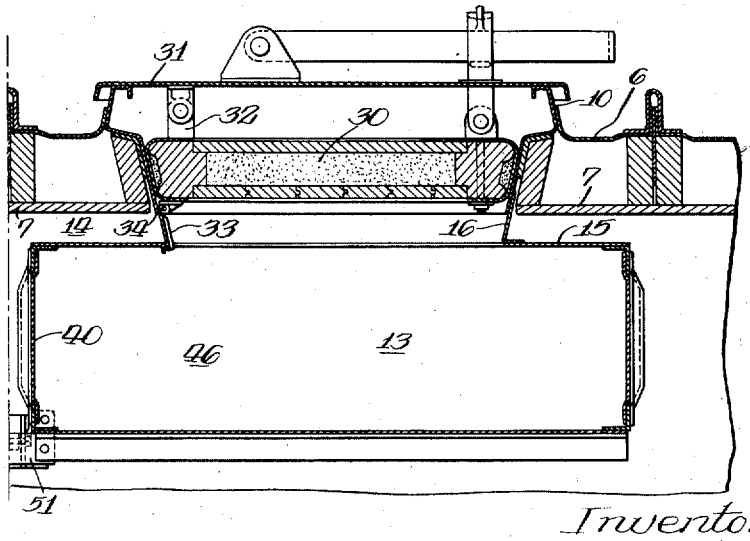
Fig. 3 is like Fig. 2 with a different lid and plug.

Fig. 3 shows a modification wherein the plug 30 is attached to the lid 31 by the supports 32 and the apron 33 is hinged (34) to the plug 30. Effectively, however, the apron 33 is hinged to the lid 31 for the purpose of this invention.

The vertical side walls 40 of the containers 13 form parts of a closed lattice truss extending between the opposite side walls 2 of the car. The truss comprises an upper chord 43, a lower chord 44, and struts consisting of the diagonal members 41 and the splice plate 45. The side wall sheets 40 would be made relatively thin so that the structure would function as a truss instead of a girder because the members 41 and splice plate 45 are relatively stiff. However, it is not to be construed that the invention is limited to either a truss or a girder but is intended to include any beam extending between the side walls of the car. The end wall sheets 46 extend between the side wall sheets 40 and function as beams between the truss of which the side wall sheets 40 are a part. The bracket arrangement provides means to attach and also preferably support the trusses to the side walls 2 of the car. The bracket arrangement is arranged so that the truss and container may be detached from the side walls and lowered without disturbing the roof of the car.

The bracket arrangement shown comprises a bracket 50 secured to the side wall 2 of the car and a bracket 51 spanning the distance between and secured to adjacent refrigerant containers 13 which also form corner reinforcements for the containers. Brackets 50 and 51 are secured together by a pin 52 which is removed to lower the containers.

The retaining wall plates may be solid when brine is used as a refrigerant and perforated or otherwise apertured when wet ice is used. In the latter case, drip pans or other means are preferably provided below the refrigerant containers to prevent the melted ice from dripping upon the commodity within the car. Also when substantially imperforate containers are provided for the retention of brine, the walls of such containers may have a few relatively small overflow apertures disposed a substantial distance above the bottoms of the containers.

By forming and constructing the vertical walls of the adjacent containers to provide trusses or guides between the opposite side walls of the car no cross beams nor framework is necessary.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a refrigerator car, a roof having a hatchway therein, a frame surrounding said hatchway with a space around the lower part of the frame, a hatch lid hinged at one side of the hatchway, a refrigerant container below said frame and spaced therefrom to provide a space therebetween, said container having an opening in the upper wall thereof surrounded on three sides by an upwardly projecting flange fitting in said space in overlapping relation with the hatch frame for the purpose specified and whereby the refrigerant container may be removed and replaced without disturbing the roof, and an apron hinged to the lid and arranged to close the space between the container and the hatch frame when the lid is in closed position and to open the space between the container and the hatch frame when the lid is in open position.

2. In a refrigerator car, a roof having a hatchway therein, a frame surrounding said hatchway with a space around the lower part of the frame, a refrigerant container below said frame and spaced therefrom to provide a space therebetween, said container having an opening in the upper wall thereof surrounded by an upwardly projecting flange fitting in said space in overlapping relation with the hatch frame for the purpose specified, the vertical side walls of said container comprising a closed lattice truss extending between the opposite side walls of the car, and means to attach said truss to said side wall so that the truss may be detached from the side walls and lowered without disturbing the roof of the car.

3. In a refrigerator car, a roof having a hatchway therein, a frame surrounding said hatchway with a space around the lower part of the frame, a hatch plug engaging the frame to close the hatchway, a refrigerant container below said frame and spaced therefrom to provide a space therebetween, said container having an opening in the upper wall thereof surrounded on three sides by an upwardly projecting flange fitting in said space in overlapping relation with the hatch frame for the purpose specified and whereby the refrigerant container may be removed and replaced without disturbing the roof, and an apron hinged to the hatch plug and arranged to close the space between the container and the hatch frame when the plug is in closed position and to open the space between the container and the hatch frame when the plug is in open position.

4. In a refrigerator car having spaced apart vertical walls, a roof extending therebetween, and a hatchway in said roof, the combination of a bracket on each vertical wall, and a refrigerant container under said hatchway, the side walls of said container formed to constitute beams extending between and supported by said brackets and the end walls of said container formed to constitute beams extending between and supported by the first mentioned beams.

5. In a refrigerator car having spaced apart vertical walls, a roof extending therebetween, a hatchway in said roof, and a frame surrounding said hatchway in combination with a bracket on each vertical wall, and a refrigerant container under said hatchway having an opening in the upper wall thereof surrounded by an upstanding flange, which flange surrounds the hatchway frame the side walls of said container formed to constitute beams extending between and supported by said brackets and the end walls of said container formed to constitute beams extending between and supported by the first mentioned beams.

6. In a refrigerator car having spaced apart vertical walls, a roof extending therebetween, a hatchway in said roof, and a frame surrounding said hatchway in combination with a bracket on each vertical wall, and a refrigerant container under said hatchway having an opening in the upper wall thereof surrounded by an upstanding flange, overlapping the hatchway frame whereby the container may be removed without disturbing the roof, the side walls of said container formed to constitute beams extending between and connected to said brackets and the end walls of said container formed to constitute beams extending between and supported by the first mentioned beams, said brackets and container associated and arranged so that when the container is disconnected from the brackets the container may be lowered vertically without removing the brackets from the side walls.

7. In a refrigerator car having spaced apart vertical walls, a roof extending therebetween and a hatch in said roof, the combination of a refrigerant container under said hatch, the side walls of said container formed to constitute beams extending between and supported by said walls and the end walls of said container formed to constitute beams extending between and supported by the first mentioned beams.

8. In a refrigerator car having spaced apart vertical walls, a roof extending therebetween and a hatch in said roof adjacent each of said walls, the combination of a refrigerant container under each of said hatches, and beams extending between and supported by said walls, each beam forming a side wall of both of said containers and the end walls of said containers formed to constitute beams extending between and supported by the first mentioned beams.

9. In a refrigerator car having a hatch in the roof, a hatchframe surrounding said hatch, a plug adapted to close said hatch, and a refrigerant container below said hatch and spaced from said roof, the top of said container being provided with a hole having an upstanding peripheral flange which meets the lower part of said frame, the combination of an opening in said flange, and an apron hinged to said plug and adapted to cover said opening when said plug closes said hatch and to uncover said opening when the hatch is open.

10. In a refrigerator car having a hatch in the roof, a hatchframe surrounding said hatch, a plug adapted to close said hatch, and a refrigerant container below said hatch and spaced from said roof, the top of said container being provided with a hole having an upstanding peripheral flange which meets the lower part of said frame, the combination of an opening in said flange, and means to close said opening when said hatch is closed and to open said opening when said hatch is open.

11. In a refrigerator car having a hatch in the roof, a hatchframe surrounding said hatch, a plug adapted to close said hatch, and a refrigerant container below said hatch and spaced from said roof, the top of said container being provided with a hole having an upstanding peripheral flange which meets the lower part of said frame, the combination of an opening in said flange, and means associated with said plug to close said opening when said hatch is closed and to open said opening when said hatch is open.

12. In a refrigerator car having spaced apart vertical walls, a roof extending therebetween and a hatch in said roof, the combination of a refrigerant container under said hatch, the side walls of said container formed to constitute beams extending between and supported by said walls and the end walls of said container formed to constitute beams extending between and supported by the first mentioned beams, the means for supporting said beams upon said walls being formed so that the container may be removed without disturbing the roof or walls of the car.

13. In a refrigerator car having a roof and a lading compartment; means disposed below said roof and above said lading compartment arranged to form a refrigerant container and a duct extending upwardly from the lading compartment adjacent said container; and a hatch in said roof above said container, said container having a top, bottom and walls which are substantially imperforate except for an opening in said top aligned with said hatch for loading refrigerant into the container, said means, at least partially in cooperation with the upper part of said car, being arranged to form a duct which communicates with said hatch and the upper part of said first mentioned duct, said ducts being arranged to direct air from said hatch at least partially across the outside surface of said container and into said lading compartment.

14. In a refrigerator car having a roof and a lading compartment; means disposed below said roof and above said lading compartment arranged to form a pair of spaced apart refrigerant containers and a duct extending upwardly from the lading compartment between said containers; and a hatch in said roof above one of said containers, said last mentioned container having a top, bottom and walls which are substantially imperforate except for an opening in said top aligned with said hatch for loading refrigerant into the container, said means, at least partially in cooperation with the upper part of said car, being arranged to form a duct which communicates with said hatch and the upper part of said first mentioned duct, said ducts being arranged to direct air from said hatch at least partially across the outside surface of said last mentioned container and into said lading compartment.

15. In a refrigerator car having a roof and a lading compartment; means disposed below said roof and above said lading compartment arranged to form a refrigerant container and a duct extending upwardly from the lading compartment adjacent said container; and a hatch in said roof above said container, said container having an opening in the upper part thereof aligned with said hatch for loading refrigerant into the container and a bottom and walls which are substantially imperforate, said means, at least partially, in cooperation with the upper part of said car, being arranged to form a duct which communicates with said hatch and the upper part of said first mentioned duct, said ducts being arranged to direct air from said hatch at least partially across the outside surface of said container and into said lading compartment.

16. In a refrigerator car having a roof and a lading compartment; means disposed below said roof and above said lading compartment arranged to form a pair of spaced apart refrigerant containers; and a hatch in said roof above one of said containers, said last mentioned container having a top, bottom and walls which are substantially imperforate except for an opening in said top aligned with said hatch for loading refrigerant into the container, said means, at least partially in cooperation with the upper part of said car, being arranged to form a duct which communicates with said hatch and the upper part of said lading compartment, said duct being arranged to direct air from said hatch at least partially across the outside surface of said last mentioned container and into said lading compartment.

GARTH G. GILPIN.